United States Patent Office.

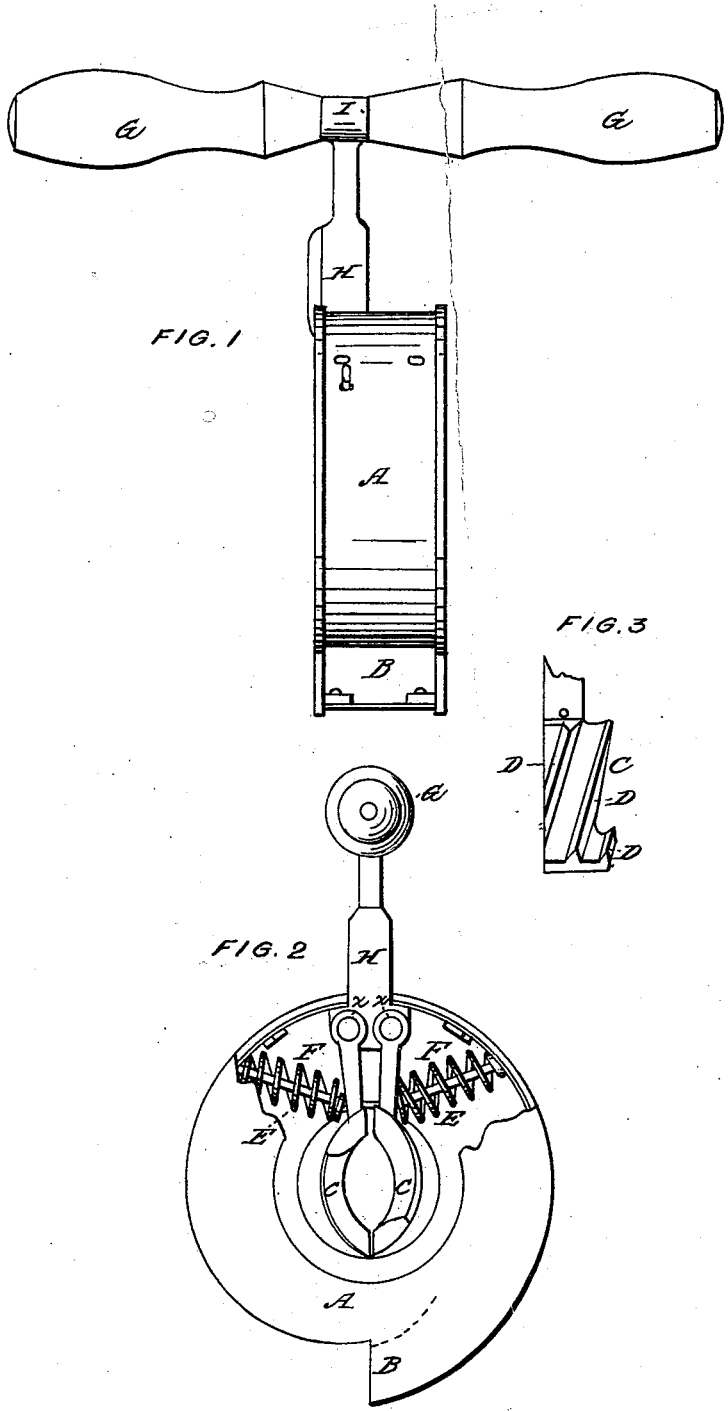

E. E. STEDMAN, OF RANDOLPH, OHIO.

Letters Patent No. 64,919, dated May 21, 1867.

---

CORN-SHELLER.

---

The Schedule referred to in these Letters Patent and making part of the same.

---

TO ALL WHOM IT MAY CONCERN:

Be it known that I, E. E. STEDMAN, of Randolph, in the county of Portage, and State of Ohio, have invented certain new and useful improvements in Corn-Shellers; and I do hereby declare that the following is a full and complete description of the construction and operation of the same, reference being had to the accompanying drawings, making a part of this specification, in which—

Figure 1 is an edge view of the sheller.
Figure 2 is a side view.
Figure 3 is a detached section.
Like letters refer to like parts in the views.

In fig. 1, A is an iron shell or case, a side view of the same being shown in fig. 2, in which it will be seen that it is in form circular, with a projecting lip or mouth, B, communicating with the interior of the case. In this case is pivoted, at the points $x$, the jaws C, fig. 2, a section of the side of the case being shown as broken away in order that they may be seen. A detached section of one of the jaws is shown in fig. 3, in which it will be observed that on the inside of the jaws are formed sections of a raised V-thread D of a screw. Each jaw being provided alike with sections of threads, forms, when brought together, as shown in fig. 3, a short length of a female coarse screw by which the corn is shelled, as will hereafter be shown. E, fig. 2, are spiral springs interposed between the jaws and the sides of the case, and which are withheld from being displaced by the rod F made to pass loosely through the jaws and the springs, and fastened to the outside of the case. The purpose of these springs is to keep the jaws close together, or rather to bring them back after being forced apart more or less by the act of shelling corn, and thus adapt it to the different-sized ears.

In order to use this machine the operator holds it by the handle G, which is loosely attached to the shank H by the collar I, at the same time taking an ear of corn in the left hand, and inserting the small end of the same between the jaws. Then, on turning the sheller round by the handle, the screw-like character of the jaws will cause the ear to draw in from one side, shelling off the corn and passing the cob out at the other side. The grain is prevented from scattering by the case, and is removed from the same through the mouth B. This mouth does not open directly into the case, but through a throat which serves as a guard or covering to the mouth, hence the shelled grain can escape from the case only at certain times. As the sheller comes round at the particular time the grain can be emptied into a basket, pan, &c. It will be evident that by the adjustable nature of the jaws, together with the contracting action of the springs, any sized ear can be shelled, and which will be found to perform the work in the most thorough manner, with but slight labor, and very expeditiously.

What I claim as my improvement, and desire to secure by Letters Patent, is—

The jaws C, springs E, as arranged in combination with the case A, for the purpose and in the manner described.

E. E. STEDMAN.

Witnesses:
J. H. BURRIDGE,
J. HOLMES.